Dec. 19, 1922.
J. F. BALDWIN, Jr.
TRANSMISSION SYSTEM.
FILED MAR. 29, 1920.
1,438,938.
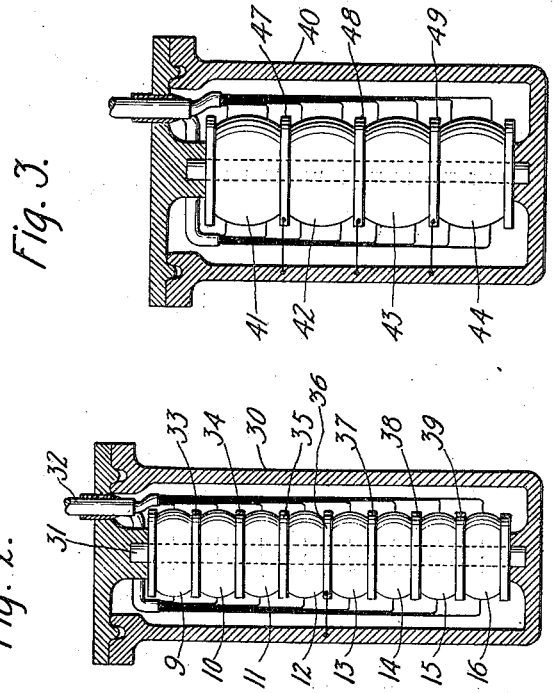
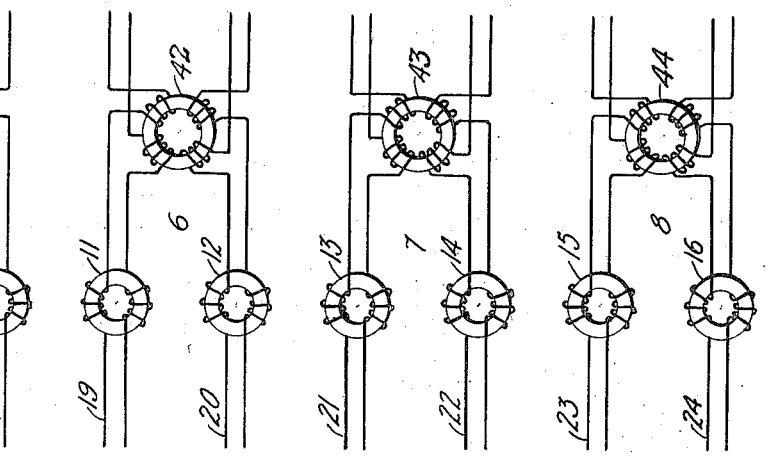
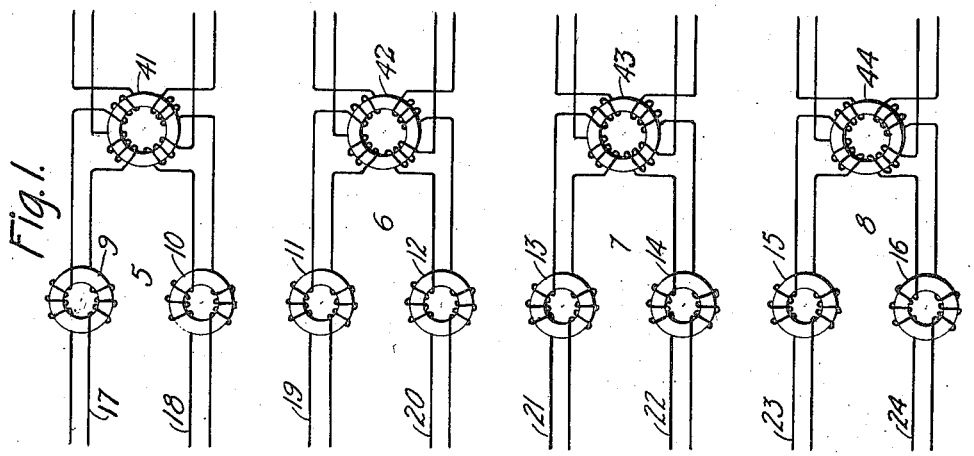
Inventor:
J. Frank Baldwin Jr.
by W. E. Beatty, Att'y.

Patented Dec. 19, 1922.

1,438,938

UNITED STATES PATENT OFFICE.

JOHN FRANK BALDWIN, JR., OF EAST ORANGE, NEW JERSEY, ASSIGNOR TO WESTERN ELECTRIC COMPANY, INCORPORATED, OF NEW YORK, N. Y., A CORPORATION OF NEW YORK.

TRANSMISSION SYSTEM.

Application filed March 29, 1920. Serial No. 369,653.

*To all whom it may concern:*

Be it known that I, JOHN FRANK BALDWIN, Jr., a citizen of the United States, residing at East Orange, in the county of Essex, State of New Jersey, have invented certain new and useful Improvements in Transmission Systems, of which the following is a full, clear, concise, and exact description.

This invention relates to transmission systems, and more particularly to transmission systems of the type known as four-wire repeater systems.

Where a number of four-wire transmission systems parallel each other, serious cross-talk difficulties are encountered owing to the high degree of amplification that it is desirable to employ in these circuits, and it is one of the objects of this invention to reduce this cross-talk to a minimum. Other further objects will be clear from the detailed description to be given later.

In four-wire transmission systems as is well known, two separate transmission lines are employed, one for transmitting in each direction, each line including one or more one-way repeaters for amplifying the transmitted current. When a number of circuits of this character closely parallel each other, the current transmitted in a line employed for transmission in one direction induces cross-talk in all of the transmission lines associated therewith. It has been found, however, that the cross-talk currents induced in lines transmitting in the opposite direction are generally much more serious than those induced in lines transmitting in the same direction. This invention is concerned chiefly with the reduction of cross-talk induced between lines transmitting in opposite directions.

In loading four-wire transmission lines, it has been a common expedient to inclose in a common pot or casing, loading coils for a plurality of lines. It has been hitherto proposed to reduce the cross-talk between adjacent coils in a common casing by so grouping the coils in the casing that the coils of the lines transmitting in one direction will be in one group and the coils for lines transmitting in the opposite direction will be in a second group, the two groups being carried by the same spindle. The cross-talk between adjacent coils transmitting in the same direction may be reduced to a negligible amount by inserting washers of magnetic material between adjacent coils.

It has been found, however, that the insertion of a washer between the two groups of coils repeating in opposite directions is not sufficient to reduce the cross-talk therebetween to a negligible amount, owing to the fact that the cross-talk between coils transmitting in opposite directions is considerably greater than that occurring between coils transmitting in the same direction. In accordance with this invention it is proposed to substantially eliminate the cross-talk occurring between the two groups transmitting in opposite directions by grounding a shield or washer located between the two groups.

This invention will be better understood by reference to the following detailed description taken in connection with the accompanying drawings in which Fig. 1, represents a plurality of four-wire transmission circuits; Fig. 2, represents a type of loading coil assembly which may be employed in loading the side circuits of Fig. 1, and Fig. 3, represents a type of loading coil assembly which may be employed in loading the phantom circuits of the four-wire transmission lines shown in Fig. 1.

Fig. 1, illustrates a plurality of four-wire transmission lines, 5, 6, 7 and 8. Loading coils 9, 10, 11, 12, 13, 14, 15 and 16 may be employed for loading the side circuits 17, 18, 19, 20, 21, 22, 23 and 24 respectively of the four-wire transmission circuits. Side circuits 17 to 20 inclusive may be employed for transmitting currents in one direction, while side circuits 21 to 24 inclusive may be employed for transmitting signaling currents in the opposite direction.

Fig. 2, illustrates a loading coil assembly which may be employed for housing the various side circuit loading coils required for the four-wire transmission lines 5, 6, 7 and 8. The casing 30 contains a spindle 31 on which is mounted loading coils 9 to 16 inclusive. Loading coils 9, to 12 inclusive which transmit in the same direction have been placed in one group, and loading coils 13 to 16 inclusive have been placed in a second group. The connecting wires for the various loading coils contained in the casing 30 may be led out through a common cable 32.

In order to prevent cross-talk occurring between loading coils transmitting in the same direction, washers 33, 34 and 35 of magnetic material such as iron may be inserted between adjacent coils. Magnetic washers 37, 38 and 39 may be inserted between the loading coils of the other group transmitting in the opposite direction for a similar purpose.

It has been found, however, that the insertion of a magnetic washer between the group of coils 9 to 12 inclusive and the group of coils 13 to 16 inclusive, while substantially eliminating any stray magnetic field between the two groups is not sufficient to reduce to a negligible amount the cross-talk occurring between the groups due to the capacity effect existing therebetween which tends to set up leakage currents. It is true that it would be possible to reduce this capacity effect to a negligible amount by greatly increasing the distance between the two groups, but such a wide spacing would not be possible when it is necessary to make the assembly of the loading coils as compact as possible. In accordance with this invention this undesired electrostatic field between the two groups may be substantially eliminated by grounding the magnetic washer 36 located therebetween. This grounding may be accomplished by connecting the magnetic washer to the external casing or housing 30. The thickness of the washer 36 need not be more than a small fraction of the width of one of the loading coils in order to give satisfactory results.

Fig. 3, illustrates the housing for a phantom loading coil assembly which may be employed in the circuits of Fig. 1, in case it is desired to phantom the four-wire circuits. As is well known it is possible to transmit in one direction employing the four wires of system 5 in parallel and to transmit in the opposite direction employing for example the four wires of system 7 in parallel. The four wires of system 6 may also be employed in parallel for transmitting in one direction, while the four wires of system 8, may be employed in parallel for transmitting in the opposite direction. The casing or housing 40 shows the phantom loading coils 41, 42, 43 and 44 for the four wire systems 5, 6, 7 and 8 mounted on a common spindle in a manner similar to the arrangement for the side circuit coils. Adjacent coils in the casing 40 are shielded from each other by means of magnetic washers 47, 48 and 49. In this case, it has been found necessary to ground each of the washers 47, 48 and 49, in order to eliminate the capacity effects between neighboring coils so as to avoid cross-talk.

It is obvious that this invention may be applied to types of transmission systems other than the type described above without departing in anywise from the spirit of this invention defined in the appended claims.

What is claimed is:

1. A transmission system comprising a plurality of conductors, a plurality of loading coils in said conductors, a common housing for said loading coils, two of said loading coils being separated from each other a distance less than the width of one of said loading coils, and means between said two loading coils for substantially eliminating the electrostatic field therebetween.

2. A transmission system including a plurality of conductors, certain of which are used for transmission in one direction and others of which are used for transmission in the opposite direction, loading coils in said conductors, said loading coils being arranged in groups so that loading coils conductors used for transmission in opposite directions will be in separate groups, and a grounded metallic shield between said groups.

3. A transmission system including a plurality of conductors certain of which are used for transmission in one direction and others of which are used for transmission in the opposite direction, loading coils in said conductors, said loading coils being arranged in groups so that loading coils in conductors used for transmission in opposite directions will be in separate groups, said two groups being separated from each other a distance less than the width of one of said loading coils, and means between said groups for substantially eliminating the electrostatic field therebetween.

4. In combination, a plurality of loading coils concentrically arranged, a common housing for said coils, two of said coils being separated from each other a distance less than the width of one of said coils, and a grounded metallic shield between said two last-mentioned coils.

In witness whereof, I hereunto subscribe my name this 25th day of March, A. D. 1920.

J. FRANK BALDWIN, JR.